(12) United States Patent
Andrade

(10) Patent No.: US 10,749,681 B2
(45) Date of Patent: *Aug. 18, 2020

(54) SYSTEMS AND METHODS FOR PROVIDING A UNIVERSAL DECENTRALIZED SOLUTION FOR VERIFICATION OF USERS WITH CROSS-VERIFICATION FEATURES

(71) Applicant: FINTECH FUND FAMILY LIMITED PARTNERSHIP, Houston, TX (US)

(72) Inventor: Marcus Andrade, Houston, TX (US)

(73) Assignee: BLACK GOLD COIN, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,344

(22) Filed: Oct. 26, 2016

(65) Prior Publication Data

US 2018/0115426 A1    Apr. 26, 2018

(51) Int. Cl.
*H04L 29/06* (2006.01)
*H04L 9/32* (2006.01)
(Continued)

(52) U.S. Cl.
CPC .......... *H04L 9/3231* (2013.01); *H04L 9/0637* (2013.01); *H04L 9/0643* (2013.01);
(Continued)

(58) Field of Classification Search
CPC ... G06Q 20/401; H04L 9/3231; H04L 9/0866; H04L 9/0637; H04L 9/0643; H04L 9/14; H04L 9/30; H04L 9/3236; H04L 2209/38
See application file for complete search history.

(56) References Cited

U.S. PATENT DOCUMENTS

| | | |
|---|---|---|
| 5,291,560 A | 3/1994 | Daugman |
| 7,949,869 B2 | 5/2011 | Deshpande et al. |

(Continued)

FOREIGN PATENT DOCUMENTS

| | | |
|---|---|---|
| CN | 20141185649 A | 7/2014 |
| WO | 20150183901 A9 | 12/2015 |
| WO | 2018007828 A2 | 1/2018 |

OTHER PUBLICATIONS

'Extcoin', "Bitcoin Stack Exchange", <https://bitcoin.stackexchange.com/questions/13984/bitcoin-network-splits>, Oct. 22, 2013, p. 1.*
(Continued)

*Primary Examiner* — John B King
(74) *Attorney, Agent, or Firm* — Whitaker Chalk Swindle & Schwartz PLLC; Stephen Mosher

(57) ABSTRACT

A system for providing a universal decentralized solution for verification of users with cross-verification features is described. The system may be configured to receive from a first entity, at a blockchain trust utility, information related to one or more verified first documents, the one or more verified first documents associated with a first user. The system may be configured to receive from a second entity, at the blockchain trust utility, a request for the information related to the one or more verified documents associated with the first user. The system may be configured to, upon receiving from the first user, at the blockchain trust utility, an approval of the request for the information related to the one or more verified documents associated with the first user, give access to the second entity to obtain access to information related to the one or more verified documents associated with the first user.

17 Claims, 5 Drawing Sheets

(51) Int. Cl.
  *H04L 9/08* (2006.01)
  *H04L 9/06* (2006.01)
  *H04L 9/14* (2006.01)
  *H04L 9/30* (2006.01)
(52) U.S. Cl.
  CPC .............. *H04L 9/0866* (2013.01); *H04L 9/14* (2013.01); *H04L 9/30* (2013.01); *H04L 9/3236* (2013.01); *H04L 2209/38* (2013.01)

(56) References Cited

U.S. PATENT DOCUMENTS

| | | | |
|---|---|---|---|
| 9,882,918 B1 | 1/2018 | Ford et al. | |
| 9,935,948 B2 | 4/2018 | Schultz et al. | |
| 10,298,396 B1* | 5/2019 | Kurani | G06F 21/33 |
| 2002/0147600 A1* | 10/2002 | Waters | G06Q 20/04 |
| | | | 705/39 |
| 2002/0178354 A1 | 11/2002 | Ogg et al. | |
| 2005/0177750 A1 | 8/2005 | Gasparini et al. | |
| 2005/0182710 A1 | 8/2005 | Andersson et al. | |
| 2005/0246290 A1 | 11/2005 | Kausik | |
| 2007/0192853 A1 | 8/2007 | Shraim et al. | |
| 2009/0024853 A1* | 1/2009 | Yeap | H04L 63/0428 |
| | | | 713/182 |
| 2009/0254440 A1 | 10/2009 | Pharris | |
| 2011/0137750 A1 | 6/2011 | Gani | |
| 2012/0084563 A1 | 4/2012 | Singhal | |
| 2013/0251214 A1 | 9/2013 | Chung et al. | |
| 2013/0346309 A1 | 12/2013 | Giori | |
| 2015/0178693 A1 | 6/2015 | Solis | |
| 2015/0237048 A1 | 8/2015 | Sun et al. | |
| 2015/0324789 A1 | 11/2015 | Dvorak et al. | |
| 2015/0332283 A1 | 11/2015 | Witchey | |
| 2015/0348017 A1 | 12/2015 | Allmen | |
| 2015/0356523 A1 | 12/2015 | Madden | |
| 2015/0356555 A1 | 12/2015 | Pennanen | |
| 2016/0027229 A1 | 1/2016 | Spanos et al. | |
| 2016/0217452 A1 | 7/2016 | Wong et al. | |
| 2016/0283941 A1 | 9/2016 | Andrade | |
| 2016/0292672 A1 | 10/2016 | Fay et al. | |
| 2016/0292680 A1* | 10/2016 | Wilson, Jr. | G06Q 20/401 |
| 2016/0308855 A1* | 10/2016 | Lacey | G06Q 50/265 |
| 2016/0328713 A1* | 11/2016 | Ebrahimi | H04L 9/3066 |
| 2016/0330027 A1 | 11/2016 | Ebrahimi | |
| 2017/0017936 A1* | 1/2017 | Bisikalo | G06Q 20/065 |
| 2017/0024579 A1 | 1/2017 | Lacey | |
| 2017/0048235 A1* | 2/2017 | Lohe | G06Q 20/065 |
| 2017/0083907 A1* | 3/2017 | McDonough | G06Q 20/14 |
| 2017/0085555 A1* | 3/2017 | Bisikalo | H04L 9/3236 |
| 2017/0111175 A1* | 4/2017 | Oberhauser | H04L 9/3247 |
| 2017/0177855 A1* | 6/2017 | Costa Faidella | H04L 63/08 |
| 2017/0222814 A1 | 8/2017 | Oberhauser et al. | |
| 2017/0232300 A1* | 8/2017 | Tran | H04L 67/12 |
| | | | 434/247 |
| 2017/0243209 A1 | 8/2017 | Johnsrud | |
| 2017/0279801 A1 | 9/2017 | Andrade | |
| 2017/0286717 A1 | 10/2017 | Khi et al. | |
| 2017/0300898 A1* | 10/2017 | Campero | H04L 9/3236 |
| 2017/0300978 A1 | 10/2017 | Narasimhan et al. | |
| 2017/0316390 A1 | 11/2017 | Smith et al. | |
| 2017/0317997 A1 | 11/2017 | Smith et al. | |
| 2018/0013567 A1* | 1/2018 | Davis | H04L 9/0637 |
| 2018/0020324 A1* | 1/2018 | Beauford | H04W 4/021 |
| 2018/0025442 A1 | 1/2018 | Isaacson et al. | |
| 2018/0048461 A1* | 2/2018 | Jutla | G06F 21/33 |
| 2018/0075247 A1 | 3/2018 | Campero et al. | |
| 2018/0082256 A1* | 3/2018 | Tummuru | G06Q 10/1053 |
| 2018/0117446 A1* | 5/2018 | Tran | A63B 21/0724 |
| 2018/0191503 A1* | 7/2018 | Alwar | G06Q 20/065 |
| 2018/0268386 A1* | 9/2018 | Wack | G06Q 20/102 |
| 2018/0285879 A1* | 10/2018 | Gadnis | H04L 9/3231 |
| 2018/0302417 A1* | 10/2018 | Wilson | H04L 9/3297 |
| 2019/0205547 A1* | 7/2019 | Horvath | G06F 21/36 |
| 2019/0288854 A1* | 9/2019 | Xie | H04L 63/08 |

OTHER PUBLICATIONS

European Patent Application No. EP15161502, Partial European Search Report, date of completion Oct. 6, 2015, 2 pages.
PCT International Application No. PCT/US2016/024776, International Search Report, dated Jun. 16, 2016, 2 pages.
PCT International Application No. PCT/US17/14938, International Search Report and Written Opinion, dated May 25, 2017, 10 pages.
PCT International Application No. PCT/IB2015/058805, International Search Report and Written Opinion dated Apr. 13, 2016, 15 pages.
Goldfedder et al. "Securing Bitcoin Wallets via Threshold Signatures", 2014, 11 pages www.cs.princeton.edu/~stevenag/bitcoin_threshold_signatures.pdf.
Meiklejohn et al., "A Fistful of Bitcoins: Characterizing Payments Among Men with No Names," University of California, San Diego, 2013, 13 pages.
Koshy, et al., "An Analysis of Anonymity in Bitcoin Using P2P Network Traffic," Pennsylvania State University, 38 pages; 2014.
Bryans, D., "Bitcoin and Money Laundering: Mining an Effective Solution," Indiana Law Journal, 89, (1), 33 pages; 2014.
Nakamoto, S., Bitcoin: A Peer-to-Peer Electronic Cash System; 9 pages; www.bitcoin.org.
PCT International Application No. PCT/US18/029371, International Search Report dated Jul. 9, 2018, 2 pages.
PCT International Application No. PCT/US2018/026136, International Search Report and Written Opinion, dated Jun. 15, 2018, 20 pages.
PCT International Application No. PCT/US18/029350, International Search Report dated Jul. 19, 2018, 2 pages.

* cited by examiner

SYSTEMS AND METHODS FOR PROVIDING A UNIVERSAL DECENTRALIZED SOLUTION FOR VERIFICATION OF USERS WITH CROSS-VERIFICATION FEATURES

FIELD OF THE DISCLOSURE

This disclosure relates to systems and methods for providing a universal decentralized solution for verification of users with cross-verification features.

BACKGROUND

Currently, systems and methods for securing information related to an individual is lacking in various ways. There is a need in the art for enhanced methods of securing information related to documents and the like. For example, there is a need in the art for enhanced methods related to biometric security.

SUMMARY

Some implementations according to the present technology are directed to using software to improve computer functionality by addressing the issue of security. Regarding security, it is desirable to be able to store information associated with an individual (user) in a secure fashion. In some implementations, it may be desirable for the user to have the capability to allow an entity (e.g., a business, institution, etc.) to access that information. In some implementations, a user's biometric data and privacy will be well protected while sharing biometric data with the public and/or others in a blockchain. Some implementations according to the present technology relate to distributed ledger technology. The present disclosure includes enhanced methods of biometric security of via face, retina, iris, fingerprint, and applied encrypted images generating a biometric authentication code applied/tagged directly to any data format that is utilized within a distributed ledger. The data output may be further enhanced by the extraction of geo-location and connection datasets.

One current problem that exists in the prior art is where, for example, Firm A has products and clients Firm B wants to use and vice versa. However, in order to currently cross-sell, each firm may have to give up some of their clients to the other in order to perform that business by utilizing (1) a distributed ledger (each firm is able to perform a keyword lookup to identify the number of clients Firm A has under that criteria); and (2) biometric verification tied directly to clients (from AML, KYC, and/or other documentation, each firm knows for certainty that those clients documents and digital identity qualified via biometric authentication are verifiable).

In some implementations, a method and associated dashboard are contemplated. There may be an associated approval method running in a mobile application that facilitates each firm exchanging basic and premium profiles of a count of clients in order to cross-sell, with the clients' approval. If there is more than one firm, this may be accomplished in a one-to-one fashion or a many-to-many cross-matching fashion.

One aspect of the disclosure may relate to a system configured for a universal decentralized solution for verification of users with cross-verification features. The system may include one or more hardware processors and/or other components. The one or more hardware processors may be configured by machine-readable instructions to receive from a first entity, at a blockchain trust utility, information related to one or more verified first documents, the one or more verified first documents associated with a first user. The one or more hardware processors may be configured to receive from a second entity, at the blockchain trust utility, a request for the information related to the one or more verified documents associated with the first user. The one or more hardware processors may be configured to, upon receiving from the first user, at the blockchain trust utility, an approval of the request for the information related to the one or more verified documents associated with the first user, give access, by the blockchain trust utility, to the second entity to obtain access to information related to the one or more verified documents associated with the first user. The one or more hardware processors may be configured to, upon receiving from the first user, at the blockchain trust utility, a denial of the request for the information related to the one or more verified documents associated with the first user, deny access, by the blockchain trust utility, to the second entity to obtain access to information related to the one or more verified documents associated with the first user.

Another aspect of the disclosure may relate to a method for providing a universal decentralized solution for verification of users with cross-verification features, the method being performed by one or more hardware processors configured by machine-readable instructions. The method may include receiving from a first entity, at a blockchain trust utility, information related to one or more verified first documents, the one or more verified first documents associated with a first user. The method may include receiving from a second entity, at the blockchain trust utility, a request for the information related to the one or more verified documents associated with the first user. The method may include, upon receiving from the first user, at the blockchain trust utility, an approval of the request for the information related to the one or more verified documents associated with the first user, giving access, by the blockchain trust utility, to the second entity to obtain access to information related to the one or more verified documents associated with the first user. The method may include, upon receiving from the first user, at the blockchain trust utility, a denial of the request for the information related to the one or more verified documents associated with the first user, denying access, by the blockchain trust utility, to the second entity to obtain access to information related to the one or more verified documents associated with the first user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
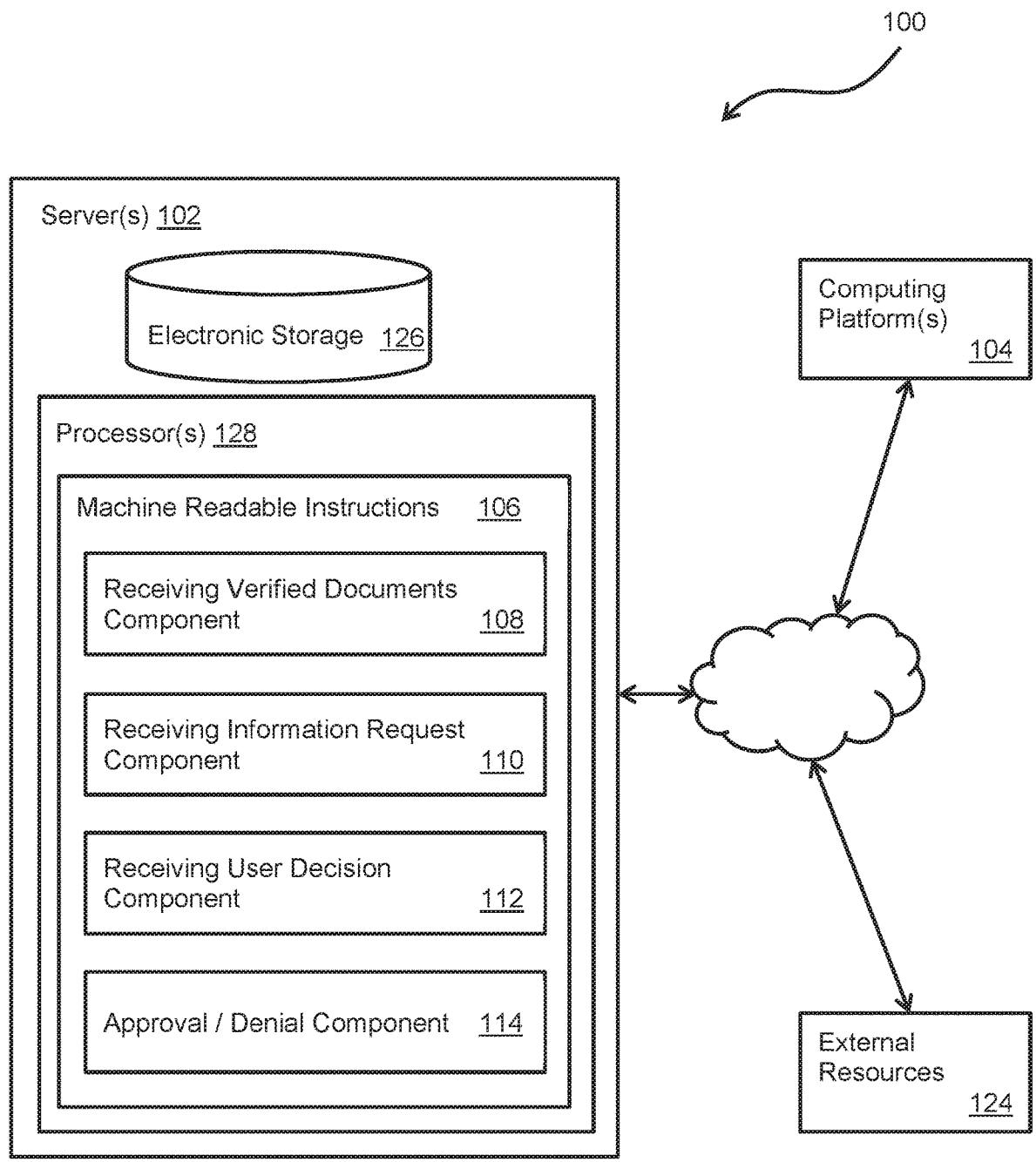
FIG. 1 illustrates a system for providing a universal decentralized solution for verification of users with cross-verification features, in accordance with one or more implementations.

FIG. 1 illustrates a system 100 for providing a universal decentralized solution for verification of users with cross-verification features, in accordance with one or more implementations. In some implementations, system 100 may include one or more servers 102. The server(s) 102 may be configured to communicate with one or more computing platforms 104 according to a client/server architecture, a peer-to-peer architecture, and/or other architectures. The users may access system 100 via computing platform(s) 104.

The server(s) 102 may be configured to execute machine-readable instructions 106. The machine-readable instructions 106 may include one or more of a receiving verified documents component 108, a receiving information request component 110, a receiving user decision component 112, an approval/denial component 114, and/or other machine-readable instruction components.

The machine-readable instructions 106 may be executable to establish verification addresses on a block chain. Generally speaking, a block chain is a transaction database shared by some or all nodes participating in system 100. Such participation may be based on the Bitcoin protocol, Ethereum protocol, and/or other protocols related to digital currencies and/or block chains. A full copy of the block chain contains every transaction ever executed in an associated digital currency. In addition to transactions, other information may be contained by the blockchain, such as described further herein.

The blockchain may be based on several blocks. A block may include a record that contains and confirms one or more waiting transactions. Periodically (e.g., roughly every one minute), a new block including transactions and/or other information may be appended to the blockchain. In some implementations, a given block in the blockchain contains a hash of the previous block. This may have the effect of creating a chain of blocks from a genesis block (i.e., the first block in the block chain) to a current block. The given block may be guaranteed to come chronologically after a previous block because the previous block's hash would otherwise not be known. The given block may be computationally impractical to modify once it is included in the block chain because every block after it would also have to be regenerated.

A given verification address may include a specific location on the blockchain where certain information is stored. In some implementations, an individual verification address may be referred to as an "AtenVerify Address."

The receiving verified documents component 108 may be configured to receive from a first entity, at a blockchain trust utility, information related to one or more verified first documents. The one or more verified first documents may be associated with a first user (individual). The first entity may include one or more of an institution, business, company, and/or other entities. In some implementations, the blockchain trust utility of the present technology may differ from a standard blockchain. It may differ in that although the present technology may utilize an Ethereum blockchain (or any other type of blockchain), not tied to any cryptocurrency, the Ethereum blockchain and/or Ethereum private blockchain, may be created to be suited for various things. Some examples may include integrating components related to biometric tagging and/or biometric encryption of documentation held within the blockchain. The use of datasets, while ensuring client/individual data privacy and adhering to rules for the global data processing directive is envisioned.

The blockchain trust utility may be a closed loop trust utility private blockchain in some implementations. In some implementations, the closed loop trust utility private blockchain may be made country-specific. In some implementations, due to data protection and information communication office rules in different countries, the blockchain may not be operated as a decentralized model. Instead, the blockchain may be operated as a closed-loop or centralized model. One reason some implementations may be country-specific is the scenario where a first country and/or business does not want confidential and/or secure information to be shared or accessed by a second country and/or business. The blockchain may be enabled to have separate implementations for country-specific practices. It should be noted that the blockchain may be operated as either a centralized model or a decentralized model, in various implementations.

In some implementations, the information related to the one or more verified documents associated with the first user may be encrypted with a first key and a second key. The first key may a server key (e.g., a private key) that is stored on a backend server. The second key may be a client key that is a hash of biometric data associated with the first user. In some implementations, the first and second keys may be applied to the blockchain immutable ID for hyper-encryption of sensitive data formats and/or associated documentation.

Receiving information request component 110 may be configured to receive from a second entity, at the blockchain trust utility, a request for the information related to the one or more verified documents associated with the first user. The second entity may include one or more of an institution, business, company, and/or other entities.

Receiving user decision component 112 may be configured to receive a decision (to give access or deny access) from the first user regarding the request for the information related to the one or more verified documents associated with the first user at the blockchain trust utility.

In some implementations, approval/denial component 114 may be configured to give or deny access to the first entity. If the request for the information is approved by the first user, access may be given by the blockchain trust utility for the second entity to obtain access to the information. Likewise, if the request for the information is not approved by the first user, access may be denied by the blockchain trust utility for the second entity to obtain access to the information. In some implementations, the blockchain trust utility holds and applies biometric authentication code validation against information related to the one or more verified documents associated with the first user. In some implementations, the first user may be notified if information related to the one or more verified documents associated with the first user is accessed by authorities or others.

System 100 may be configured to associate identifiers with individuals having previously verified personal identities. For example, a first identifier may be associated a first individual. The first individual may have a previously verified personal identity. Generally speaking, an identifier may include one or more of a number, an alphanumeric code, a username, and/or other information that can be linked to an individual. In some implementations, an individual identifier may be referred to as an "Aten ID."

In accordance with some implementations, an individual having a previously verified personal identity may have obtained the previously verified personal identity through a variety of approaches. For example, in some implementations the individual may be required to provide evidence of the individual's identity. Such evidence (the information referred to above) may include one or more of providing a copy of a government issued identification (e.g., passport and/or driver's license), providing a copy of mail received by the individual (e.g., a utility bill), evidence provided by a third party, and/or other evidence on an individual's identity. The evidence may be provided to an entity associated with server(s) 102.

System 100 may be configured to assign verification addresses on a block chain to the individuals. A given verification address may include a public key and a private key. By way of example, a first verification address may be assigned to the first individual. The first verification address may include a first public key and a first private key.

Generally speaking, a public and private key-pair may be used for encryption and decryption according to one or more public key algorithms. By way of non-limiting example, a key pair may be used for digital signatures. Such a key pair may include a private key for signing and a public key for verification. The public key may be widely distributed, while the private key is kept secret (e.g., known only to its proprietor). The keys may be related mathematically, but calculating the private key from the public key is unfeasible.

In some implementations, system 100 may be configured such that private keys may be stored within computing platform(s) 104. For example, the first private key may be stored within a computing platform 104 and/or other locations associated with the first individual. In accordance with some implementations, a private key may be stored in one or more of a "verify.dat" file, a SIM card, and/or other locations.

In some implementations, system 100 may be configured such that multiple verification addresses may be assigned to separate individuals. For example, in addition to the first verification address, a second verification address may be assigned to the first individual. One or more additional verification addresses may be assigned to the first individual, in accordance with one or more implementations.

System 100 may be configured to record identifiers and biometric data associated with the individuals at corresponding verification addresses. For example, the first identifier and first biometric data associated with the first individual may be recorded at the first verification address. Recording information at a given verification address may include recording a hash or other encrypted representation of the information. In some implementations, different biometric data may be recorded at multiple verification addresses assigned to a single given individual. For example, in addition to the first identifier and the first biometric data associated with the first individual (first user) being recorded at the first verification address, the first identifier and second biometric data associated with the first individual may be recorded at a second verification address.

Generally speaking, biometric data may include metrics related to human characteristics. Biometric identifiers are distinctive, measurable characteristics that can be used to label and describe individuals. Biometric identifiers typically include physiological characteristics, but may also include behavioral characteristics and/or other characteristics. Physiological characteristics may be related to the shape of an individual's body. Examples of physiological characteristics used as biometric data may include one or more of fingerprint, palm veins, face recognition, DNA, palm print, hand geometry, iris recognition, retina, odor or scent, and/or other physiological characteristics. Behavioral characteristics may be related to a pattern of behavior of an individual. Examples of behavioral characteristics used as biometric data may include one or more of typing rhythm, gait, voice, and/or other behavioral characteristics.

The biometric data may include one or more of an image or other visual representation of a physiological characteristic, a recording of a behavioral characteristic, a template of a physiological characteristic and/or behavioral characteristic, and/or other biometric data. A template may include a synthesis of relevant features extracted from the source. A template may include one or more of a vector describing features of a physiological characteristic and/or behavioral characteristic, a numerical representation of a physiological characteristic and/or behavioral characteristic, an image with particular properties, and/or other information.

Biometric data may be received via computing platforms 104 associated with the individuals. For example, biometric data associated with a first individual may be received via a first computing platform 104 associated with the first individual. The first computing platform 104 may include an input device (not depicted) configured to capture and/or record a physiological characteristic and/or behavioral characteristic of the first individual. Examples of such an input device may include one or more of a camera and/or other imaging device, a fingerprint scanner, a microphone, an accelerometer, and/or other input devices.

System 100 may be configured to provide an interface for presentation to individuals via associated computing platforms 104. The interface may include a graphical user interface presented via individual computing platforms 104. According to some implementations, the interface may be configured to allow a given individual to add or delete verification addresses assigned to the given individual so long as at least one verification address is assigned to the given individual.

In some implementations, system 100 may be configured to access and/or manage one or more user profiles and/or user information associated with users of system 100. The one or more user profiles and/or user information may include information stored by server(s) 102, one or more of the computing platform(s) 104, and/or other storage locations. The user profiles may include, for example, information identifying users (e.g., a username or handle, a number, an identifier, and/or other identifying information), security login information (e.g., a login code or password), system account information, subscription information, digital currency account information (e.g., related to currency held in credit for a user), relationship information (e.g., information related to relationships between users in system 100), system usage information, demographic information associated with users, interaction history among users in system 100, information stated by users, purchase information of users, browsing history of users, a computing platform identification associated with a user, a phone number associated with a user, and/or other information related to users.

The machine-readable instructions 106 may be executable to perform block chain-based multifactor personal identity verification using the verification addresses.

System 100 may be configured to receive one or more identifiers in connection with one or more requests to verify an identity of one or more individuals. For example, the first identifier may be received in connection with a request to verify an identity of the first individual. Requests for identity verification may be provided in connection with and/or related to financial transactions, information exchanges, and/or other interactions. Requests may be received from other individuals and/or other third parties.

System 100 may be configured to extract the biometric data associated with the one or more individuals from the corresponding verification addresses. For example, the first biometric data associated with the first individual may be extracted from the first verification address. Extracting information (e.g., biometric data) from a verification address may include decrypting information.

According to some implementations, system 100 may be configured such that, responsive to receiving the request to verify the identity of the first individual, a prompt may be provided to the first individual for biometric data matching the first biometric data and a private key matching the first private key. The prompt may be conveyed via a computing platform 104 associated with the first individual. The prompt may be conveyed via a graphical user interface and/or other user interface provided by the computing platform 104 associated with the first individual. The prompt may include an indication that is one or more of visual, audible, haptic, and/or other indications.

In some implementations, system 100 may be configured such that, responsive to receiving the request to verify the identity of the first individual, a prompt may be provided to a computing platform 104 associated with the first individual. The prompt may cause the computing platform 104 to automatically provide, to server(s) 102, biometric data matching the first biometric data and/or a private key matching the first private key.

System 100 may be configured to verify the identity of the one or more individuals upon, or in response to, receiving matching biometric data and private keys. For example, the personal identity of the first individual may be verified upon receipt of (1) biometric data matching the first biometric data and (2) a private key matching the first private key. Verifying the personal identity of the first individual may include comparing stored information with newly received information.

According to some implementations, identity system 100 may be configured such that the personal identity of the first individual may be verified upon receipt of (1) biometric data matching the first biometric data or the second biometric data and (2) a private key matching the first private key. Such implementations may provide so-called "M-of-N" signatures for identity verification where some subset of a larger set of identifying information is required.

In some implementations, system 100 may be configured such that the biometric data matching the first biometric data and the private key matching the first private key may be used to sign the verification of the personal identity of the first individual.

In some implementations, at least one dedicated node performs the signing of the verification of the personal identity of the first individual or user. A given dedicated node may include one or more of server(s) 102. The given dedicated node may be a public node or a private node configured for creating new blocks and/or for signing verification.

Figure 2:
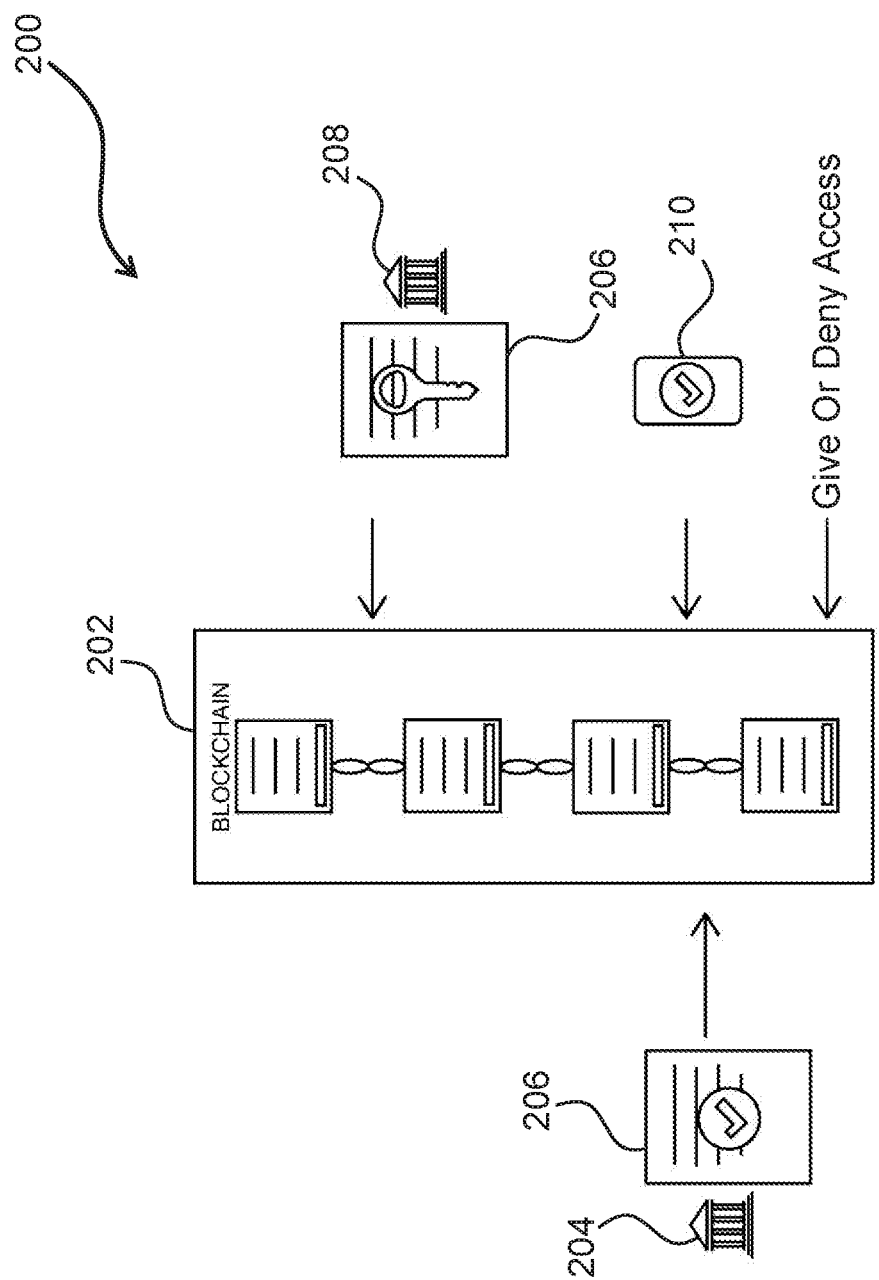
FIG. 2 is a schematic showing how entities may communicate with a blockchain trust utility, in accordance with one or more implementations

FIG. 2 is a schematic 200 showing how entities may communicate with a blockchain trust utility 202, in accordance with one or more implementations. Blockchain trust utility 202 may receive from a first entity 204, information related to one or more verified first documents 206, the one or more verified first documents 206 associated with a first user.

In some implementations, blockchain trust utility 202 may receive from a second entity 208 a request for the information related to the one or more verified documents 206 associated with the first user. One or more documents 206 may be encrypted using, for example, an entity key to provide unique access.

In some implementations, blockchain trust utility 202 may receive a decision (approval or denial) from the first user, regarding the request for the information related to the one or more verified documents associated with the first user.

In some implementations, system 100 may give (grant) or deny access to the first user. If the request for the information is approved by the first user, access may be given by blockchain trust utility 202 for second entity 208 to obtain access to the information. Likewise, if the request for the information is not approved by the first user, access may be denied by blockchain trust utility 202 for second entity 208 to obtain access to the information.

Figure 3:
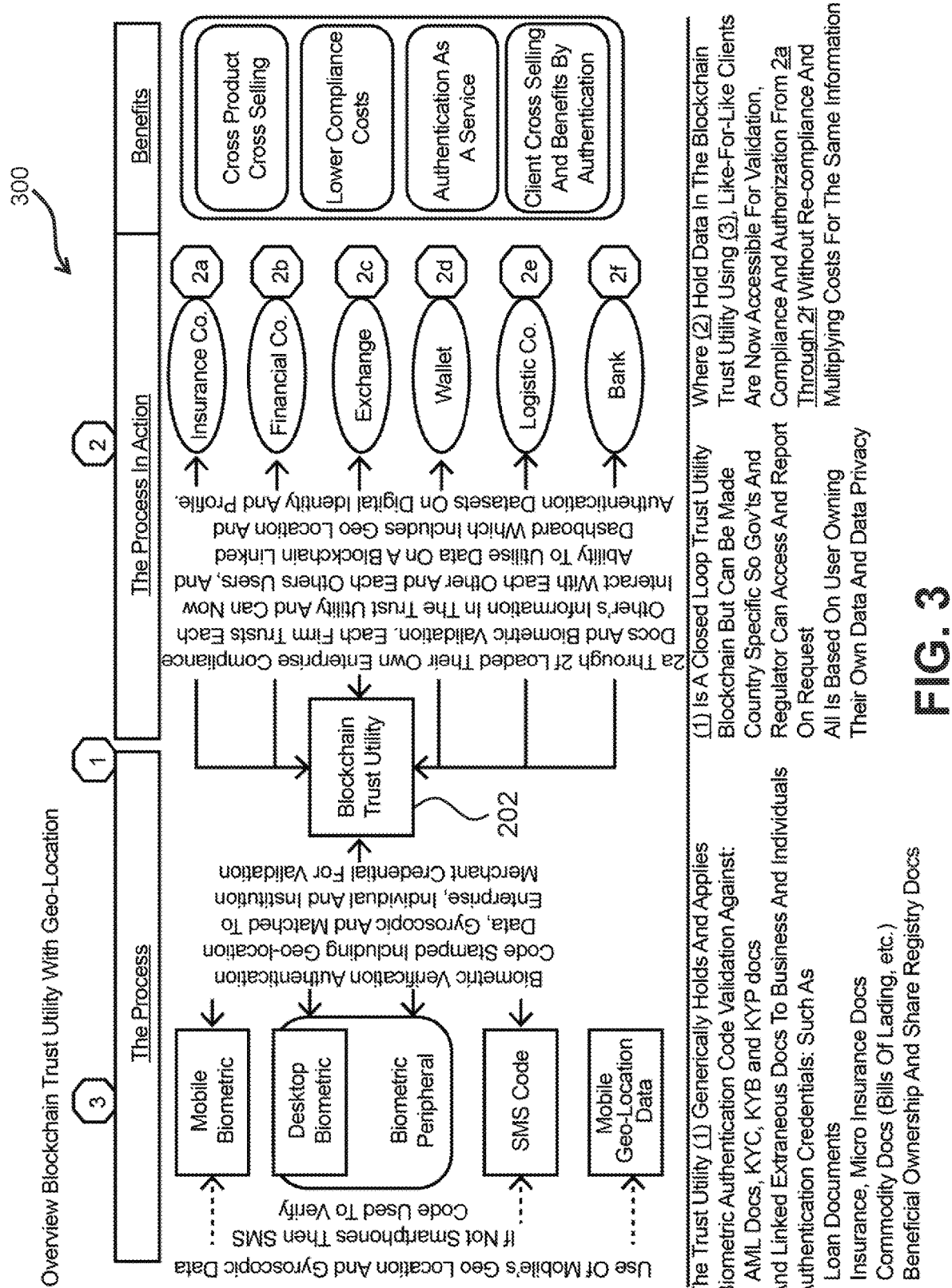
FIG. 3 illustrates an overview of a blockchain trust utility with geo-location, in accordance with one or more implementations.

FIG. 3 illustrates an overview 300 of blockchain trust utility 202 with geo-location, in accordance with one or more implementations. Location data may be any information about an individual's current location, or about their movements in the past, which can be linked to them. In some implementations, the types of data collected and applicable may include: base station data Received Signal Strength Indicator (RSSI), Time Difference of Arrival (TDOA), and Angle Of Arrival (AOA), GPS data, WIFI Access points (including Medium Access Control (MAC) addresses via mobile or passive scanning); static geo-location, dynamic/ongoing geolocation, and/or service set IDs (SSIDs), The use of keyhole markup language (KML) files to create datasets is contemplated; however, the use of any location-based dataset that utilizes markup languages is contemplated.

In some embodiments, certain rules for geo-location may be followed. A legal framework may be the data protection directive (95/46/EC). It may apply in cases where personal data is being processed as a result of the processing of location data. The e-privacy directive (2002/58/EC, as revised by 2009/136/EC) applies to the processing of base station data by public electronic communication services and networks (telecom operators). In some implementations, blockchain trust utility 202 generically holds and applies biometric code validation against one or more of anti-money laundering (AML) documents, know your customer (KYC) documents, know your business (KYB) documents, know your person/process (KYP) documents, extraneous documents linked to businesses and individuals, various authentication credentials, and/or other items.

Figure 4:
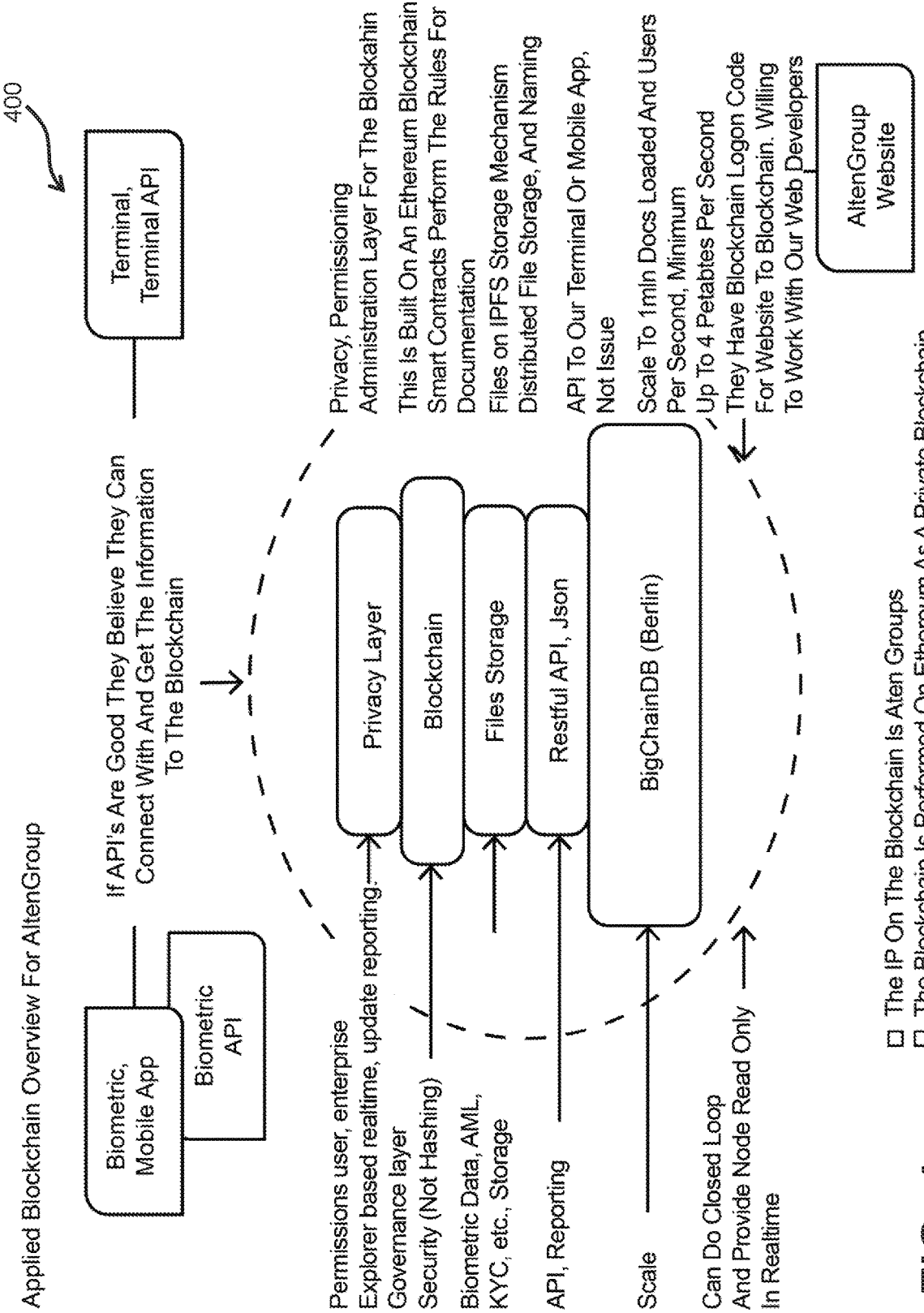
FIG. 4 illustrates an applied blockchain overview, in accordance with one or more implementations.

FIG. 4 illustrates an applied blockchain overview 400, in accordance with one or more implementations. As shown and described in the figure, a privacy permissioning administration layer for the blockchain is envisioned. It may be built on, for example, an Ethereum blockchain. As shown, there may be a mechanism for the storage of files (e.g., biometric data, etc.). These items may be coupled with an application programming interface (API) and, inter alia, a BigChainDB. This may be coupled with, for example, a biometric app and a website, among other things.

In some implementations, server(s) 102, computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, computing platform(s) 104, and/or external resources 122 may be operatively linked via some other communication media.

A given computing platform 104 may include one or more processors configured to execute machine-readable instructions. The machine-readable instructions may be configured to enable an expert or user associated with the given computing platform 104 to interface with system 100 and/or external resources 122, and/or provide other functionality attributed herein to computing platform(s) 104. By way of non-limiting example, the given computing platform 104 may include one or more of a desktop computer, a laptop computer, a handheld computer, a tablet computing platform, a NetBook, a Smartphone, a gaming console, and/or other computing platforms.

External resources 122 may include sources of information, hosts, and/or providers of virtual environments outside of system 100, external entities participating with system 100, and/or other resources. In some implementations, some or all of the functionality attributed herein to external resources 100 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from computing platform(s) 104, and/or other information that enables server (s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor (s) 126 may be configured to execute machine-readable instruction components 108, 110, 112, 114, and/or other machine-readable instruction components. Processor(s) 126 may be configured to execute machine-readable instruction components 108, 110, 112, 114, and/or other machine-readable instruction components by software; hardware; firmware; some combination of software, hardware, and/or firmware; and/or other mechanisms for configuring processing capabilities on processor(s) 126. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 108, 110, 112, 114 are illustrated in FIG. 1 as being implemented within a single processing unit, in implementations in which processor(s) 126 includes multiple processing units, one or more of machine-readable instruction components 108, 110, 112, and/or 114 may be implemented remotely from the other machine-readable instruction components. The description of the functionality provided by the different machine-readable instruction components 108, 110, 112, and/or 14 described below is for illustrative purposes, and is not intended to be limiting, as any of machine-readable instruction components 108, 110, 112, and/or 114 may provide more or less functionality than is described. For example, one or more of machine-readable instruction components 108, 110, 112, and/or 114 may be eliminated, and some or all of its functionality may be provided by other ones of machine-readable instruction components 108, 110, 112, and/or 114. As another example, processor(s) 126 may be configured to execute one or more additional machine-readable instruction components that may perform some or all of the functionality attributed below to one of machine-readable instruction components 108, 110, 112, and/or 114.

Figure 5:
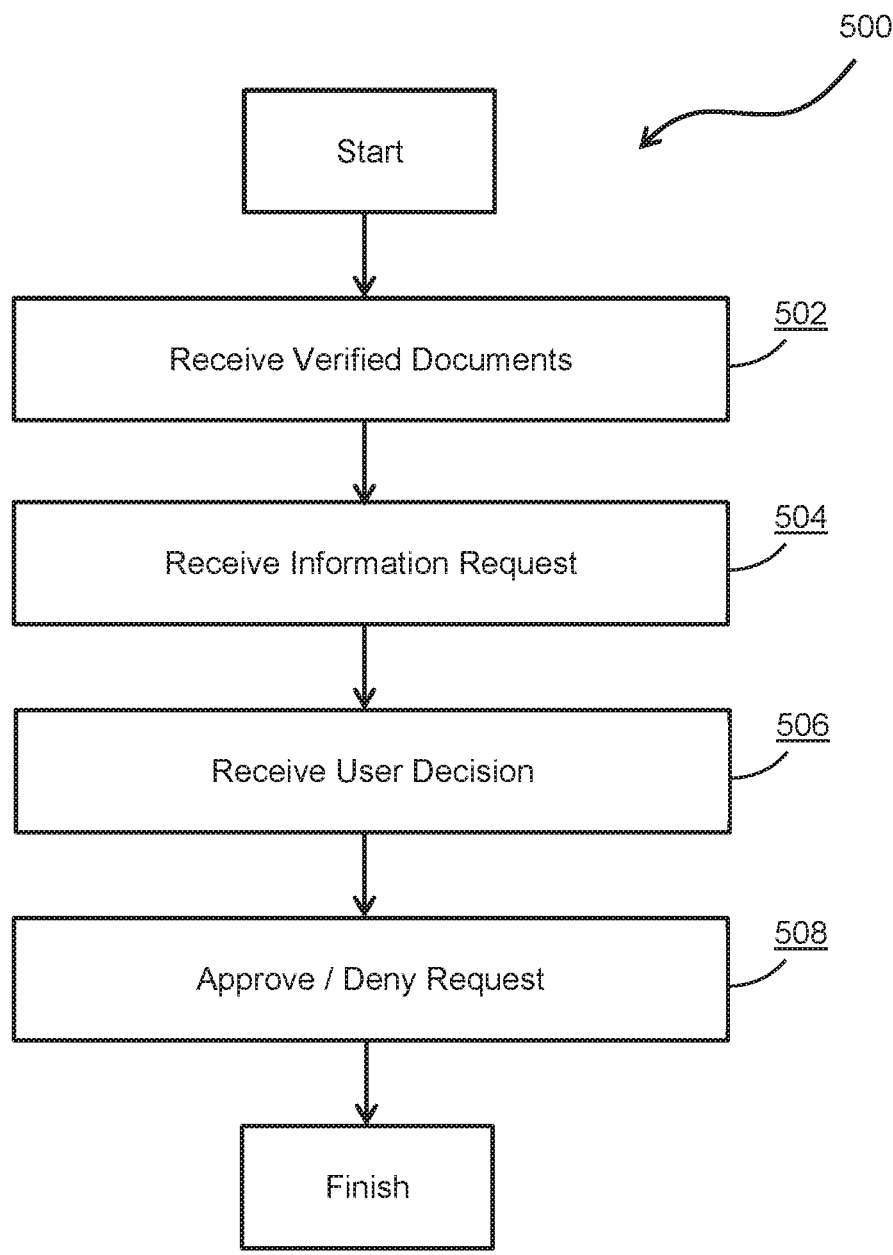
FIG. 5 illustrates a method for providing a universal decentralized solution for verification of users with cross-verification features, in accordance with one or more implementations.

FIG. 5 illustrates a method 500 for providing a universal decentralized solution for verification of users with cross-verification features, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, one or more operations of method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, method 500 may include receiving from a first entity, at a blockchain trust utility, information related to one or more verified first documents 206, one or more verified first documents 206 being associated with a first user. Operation 502 may be performed by one or more hardware processors configured to execute a machine-readable instruction component that is the same as or similar to receiving verified documents component 108 (as described in connection with FIG. 1), in accordance with one or more implementations.

At an operation 504, method 500 may include receiving from second entity 208, at blockchain trust utility 202, a request for the information related to one or more verified documents 206 associated with the first user. Operation 504 may be performed by one or more hardware processors configured to execute a machine-readable instruction component that is the same as or similar to receiving information request component 110 (as described in connection with FIG. 1), in accordance with one or more implementations.

At an operation 506, method 500 may include receiving a decision (approval or denial) from the first user, at blockchain trust utility 202, regarding the request for access to the information, and/or the information itself, related to one or more verified documents 206 associated with the first user. Operation 506 may be performed by one or more hardware processors configured to execute a machine-readable instruction component that is the same as or similar to receiving user decision component 112 (as described in connection with FIG. 1), in accordance with one or more implementations.

At an operation 508, method 500 may include giving or denying access to second entity 208. If the request for the information is approved by the first user, access may be given by blockchain trust utility 202 for second entity 208 to obtain access to the information. Likewise, if the request for the information is not approved by the first user, access may be denied by the blockchain trust utility for second entity 208 to obtain access to the information. Operation 508 may be performed by one or more hardware processors configured to execute a machine-readable instruction component that is the same as or similar to approval/denial component 114 (as described in connection with FIG. 1), in accordance with one or more implementations.

Exemplary implementations may facilitate storing personal data on the block chain. The personal data may be stored on the block chain in an encrypted way. A person may be identified at the block chain level with one or more of a private key, a finger print, a finger print hash, an eye retina, an eye retina hash, and/or other unique information. The data stored may include or relate to one or more of a passport, an identification card, extracted passport information, a driver's license, extracted driver's license information, finger print, eye retina, and/or other information. According to some implementations, if some of the data is changed, a new record may be created for that person in the block chain. That is, all changes are added as new records. The old record will always be stored on the block chain. Generally speaking, all records on the block chain are stored forever and cannot be removed. More than one copy of the block chain will exist to ensure the records are not manipulated.

Exemplary implementations may facilitate access to personal data. There may be multiple access levels for the personal data in the block chain. Access controls may be grated on public/private key pairs levels. Examples of access levels may include one or more of Super Admin (full access to block chain), Authorities-country level (full read-only access), Authorities-state/local level (limited read-only access), Police and other services including Emergency (access to certain personal data by Finger Print/Eye retina of that person only), Participating Merchants (limited access), and/or other access levels.

Exemplary implementations may facilitate verification check. There may be multiple levels for how it is possible to check verification. For example, some implementations may ensure a person has a record at "Company" but no personal data is provided. Some implementations may ensure a person has a record at Company and get very basic personal information such as Full Name, DOB, Gender, and/or other basic information. Some implementations may ensure a person has a record at Company and get all personal data.

In some implementations, the technology may relate to using the PAS 1192-5 standard to manage construction information and keep information related to architecture and building construction secure. PAS 1192-5 is a standard for security-minded building information modeling (BIM) and smart asset management. These aspects may be related to relation to smart Cities, connected cities, connected houses, smart grids (e.g. energy, etc.), and/or the like. These aspects may relate to the underlying security for Internet of Things (IoT) for smart devices interconnecting but at a construction, architectural, and/or grid based level.

AS 1192-5:2015 is the specification for security-minded building information modelling, digital built environments and smart asset management.

PAS 1192-5 specifies the processes that may assist organizations in identifying and implementing appropriate and proportionate measures to reduce the risk of loss or disclosure of information that could impact on the safety and security of: personnel and other occupants or users of the built asset and its services; the built asset itself; asset information; and/or the benefits the built asset exists to deliver.

Such processes can also be applied to protect against the loss, theft, and/or disclosure of valuable commercial information and intellectual property.

The PAS has been developed to integrate a security-minded approach into the construction lifecycle processes as specified in PAS 1192-2 and the asset management processes described in PAS 1192-3.

PAS may be specifically applied to the built asset, which may be a single building, a site or campus, and/or a portfolio or network of assets.

These aspects may be related to the mobile data that can be processed, collated, and/or held within the blockchain (whether in regards to the biometric identity of an individual and/or client).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for cross-verifying verified personal identity documents associated with an individual identifier of an individual first user, comprising:
a distributed ledger system configured with one or more hardware processors coupled to a network of nodes and servers and machine readable instructions stored in a non-transitory memory to perform the steps of:
storing, in electronic association with a verification address on the distributed ledger and secured by at least two factors, the personal identity documents of the individual first user associated with the individual identifier received and previously recorded by a first entity in the distributed ledger at a location associated with the verification address;
providing, responsive to a request from a second entity, the request including the verification address, the individual identifier and the at least two factors for the personal identity documents of the individual first user held by the first entity and previously verified, either a grant or denial by the individual first user to supply the requested personal identity documents of the individual first user upon verification of the verification address, the individual identifier and the at least two factors; and
enabling access to the verified personal identity documents if the request is granted by the individual first user, and the at least two factors supplied by the second entity are authenticated; wherein
the cross-verified personal identity documents include one or more documents from the group consisting of government-issued identity documents, copies of mail received by the individual first user, digital signature data, and geo-location data.

2. The method of claim 1, wherein:
the distributed ledger comprises a blockchain.

3. The method of claim 1, wherein a verification address comprises:
a location on the distributed ledger of the personal identity documents in association with the individual identifier.

4. The method of claim 1, wherein the at least two factors comprise a password and a biometric authentication code selected from the group consisting of facial, retina, iris, palm, finger print, voice, and other physiological and behavioral characteristics such as gait and typing rhythm.

5. The method of claim 1, wherein the personal identity documents further comprise:
personal identity information selected from the group consisting of government-issued passport, driver's license, social security number, a utility bill, and information regarding anti-money laundering (AML), know-your-customer (KYC), and know-your-business (KNB).

6. The method of claim 1, wherein the individual identifier comprises:
an identifier selected from the group consisting of a number, an alpha-numeric code, a user name, and location information.

7. The method of claim 1, wherein the first entity is an institution or a business that retained the personal identity documents of its business clients.

8. The method of claim 1, wherein the second entity is an institution or a business that requests the personal identity documents of the individual first user.

9. The method of claim 1, wherein further comprising the step of:
inhibiting access to the verified personal identity documents if the request is denied.

10. A method of cross-verifying verified personal identity documents to verify an identity of an individual user, comprising the steps of:
configuring a distributed ledger, including one or more computer-readable storage media adapted to store a blockchain having one or more transaction records in association with a verification address and a personal identifier;
configuring a computer system comprising one or more processors programmed to execute computer program instructions that, when executed, cause the computer system to:
receive information related to one or more verified personal identity documents, the information related to one or more verified personal identity documents associated with a user by a user identifier, first biometric data associated with the user, and a first key, wherein the information, first biometric data, and the first key are assigned a verification address on a blockchain storing one or more transaction records:
store the information related to one or more verified personal identity documents, the first biometric data, and the first key at the verification address on the blockchain;
receive from an entity, a request to verify the identity of the individual user identified in the personal identity documents or provide the information related to one or more verified personal identity documents associated with the user;
receive, from a computing platform associated with the individual user, a decision to provide the entity with a verification of the identity of the individual user;
provide the information related to one or more verified personal identity documents associated with the individual user, the information including second biometric data and a second key;
obtain the first biometric data and the first key from the blockchain using the verification address and the personal identifier; and
provide the one or more verified personal identity documents associated with the individual user to the entity, responsive to a determination that the second biometric data matches the first biometric data and the second key matches the first key.

11. The method of claim 10, wherein the verified personal identity documents include government-issued identity documents, copies of mail received by the first user, digital signature data, and geo-location data.

12. The method of claim 10, wherein the verification address comprises a location on the distributed ledger in association with the personal identifier and the verified personal identity documents.

13. The method of claim 10, wherein the biometric information data include at least one of image or vector data of a face, retina, iris, palm print, finger print, voice, physiological characteristic, and behavioral characteristic.

14. A system for providing a universal decentralized solution for verification of user identity with cross-verification features, the system comprising:
one or more hardware processors configured by machine-readable instructions to:
receive information related to one or more verified personal identity documents, the information related to the one or more verified personal identity documents associated with an individual user by a user identifier, first biometric data associated with the user, and a first key, wherein the information, first biometric data, and the first key are assigned a verification address on a blockchain storing one or more transaction records;

store the information related to the one or more verified personal identity documents, the first biometric data, and the first key at the verification address on the blockchain;

receive from an entity, a request to verify the identity of the individual user or provide the information related to one or more verified personal identity documents associated with the user:

receive, from a computing platform associated with the individual user, a decision to grant or deny access to the entity with a verification of the identity of the individual user;

provide the information related to one or more verified personal identity documents associated with the individual user, the information including second biometric data and a second key;

obtain the first biometric data and the first key from the blockchain using the verification address and the personal identifier; and provide the one or more verified personal identity documents associated with the individual user to the entity, responsive to a determination that the second biometric data matches the first biometric data and the second key matches the first key.

15. The system of claim 14, wherein the verified personal identity documents include government-issued identity documents, copies of mail received by the first user, digital signature data, and geo-location data.

16. The system of claim 14, wherein the verification address comprises a location on the blockchain secured with at least a public key and a private key.

17. The system of claim 14, wherein the second biometric data and the second key, are used to sign the verification.

* * * * *